United States Patent [19]

Johnson

[11] 4,426,500

[45] Jan. 17, 1984

[54] POLYMER SOLUBILIZATION

[75] Inventor: Timothy W. Johnson, Bartlesville, Okla.

[73] Assignee: Phillips Petroleum Company, Bartlesville, Okla.

[21] Appl. No.: 410,686

[22] Filed: Aug. 23, 1982

[51] Int. Cl.³ .......................................... C08F 283/00
[52] U.S. Cl. ................................. 525/537; 252/79.1; 523/124; 524/462; 524/464; 524/486; 524/490; 524/609; 502/169; 502/229; 502/231
[58] Field of Search .................. 525/537; 523/124; 524/462, 464, 486, 490, 609; 252/79.1, 429 R, 441, 442

[56] References Cited

U.S. PATENT DOCUMENTS

| | | | |
|---|---|---|---|
| 3,145,889 | 12/1968 | Louthan | 260/609 |
| 3,395,132 | 7/1968 | Smith | 525/537 |
| 3,497,406 | 2/1970 | Skoog | 156/2 |
| 4,282,347 | 8/1981 | Tieszen et al. | 525/537 |

*Primary Examiner*—Melvyn I. Marquis

[57] ABSTRACT

Arylene sulfide polymers such as poly(p-phenylene sulfide) are solubilized (depolymerized) under mild conditions by contact with a solution comprising at least one aromatic hydrocarbon and a Group IIIA metal halide. In a specific embodiment, arylene sulfide polymers are depolymerized to form aryl sulfides. The solution is useful to remove arylene sulfide polymers deposited on process equipment.

16 Claims, No Drawings

POLYMER SOLUBILIZATION

FIELD OF INVENTION

This invention relates to the solubilization of arylene sulfide polymers. In accordance with another aspect, this invention relates to the use of a solution to solubilize arylene sulfide polymers. In accordance with a further aspect, this invention relates to the use of a solution to remove arylene sulfide polymer deposits from process equipment. In accordance with another aspect, this invention relates to the depolymerization of arylene sulfide polymers to form a solution comprising a complex mixture of aryl sulfides. In accordance with a specific aspect, this invention relates to the use of a solution comprising aromatic hydrocarbon and a metal halide to solubilize poly(arylene sulfide) resins. In accordance with a further aspect, process equipment, such as clogged filter screens, is cleaned by treatment with a solution comprising aromatic hydrocarbon and a metal halide under conditions which solubilize poly(arylene sulfide) resin deposits present in the process equipment.

BACKGROUND OF THE INVENTION

Arylene sulfide polymers, such as poly(p-phenylene sulfide), abbreviated PPS generally have limited solubility in most common solvents and usually only at elevated temperatures, e.g., about 200° C. or higher. U.S. Pat. No. 3,415,889, issued Dec. 10, 1968 to Rector P. Louthan, discloses that PPS can be depolymerized (solubilized) in contact with a mixture comprising N-methyl pyrrolidone, sodium hydroxide, and hydrogen sulfide at 260° C. for five hours.

In applications, such as in the production of fibers and films from arylene sulfide polymers, the melt flow and molecular weight of the polymer oftentimes changes characteristics during processing of the polymer, especially at elevated temperatures. During processing, the polymer (PPS) tends to form deposits due to gel formation, thereby tending to plug filters and spinnerets, causing premature shutdowns and additional cleanup operations. The present invention relates to compositions and process for solubilizing polymeric deposits such as are present in process equipment and remove these deposits from the equipment so that the equipment can then be returned to normal operation.

Accordingly, an object of this invention is to provide a solution useful for solubilizing poly(arylene sulfide) resins.

Another object of this invention is to provide a process for the formation of aryl sulfides.

A further object of this invention is to provide a process for cleaning process equipment having poly(arylene sulfide) resin deposits thereon.

A further object of this invention is to provide an effective process and composition for solubilizing and cleaning process equipment of polymeric deposits.

Other objects, aspects, and the several advantages of the invention will be apparent to those skilled in the art upon a study of the specification and the appended claims.

SUMMARY OF THE INVENTION

This invention pertains to the solubilization (depolymerization) of poly(arylene sulfide) resins, such as poly(p-phenylene sulfide), under mild conditions by contact with a solution comprising an aromatic hydrocarbon and a metal halide selected from the halides of aluminum, gallium, and indium of Periodic Group IIIA. The solution formed following depolymerization comprises a complex mixture of aryl sulfides.

In accordance with one embodiment of the invention, a solution comprising at least one aromatic hydrocarbon including halide-substituted derivatives thereof and a halide of aluminum, gallium, or indium is used to solubilize poly(phenylene sulfide) under mild conditions.

In accordance with a further embodiment of the invention, process equipment contaminated with poly(arylene sulfide) resin deposits is cleaned of these deposits by contact with a solution comprising aromatic hydrocarbons and halide derivatives thereof and at least one of a halide of aluminum, gallium, and indium.

Further, it has been found that the solution formed following depolymerization comprises a complex mixture of aryl sulfides which can be separated into the individual components following deactivation of the metal halide by contacting with an alkanol and an inorganic acid.

DESCRIPTION OF PREFERRED EMBODIMENT

As indicated hereinbefore, the invention comprises a solution comprising aromatic hydrocarbon and a metal halide to solubilize poly(arylene sulfide) resins.

Aromatic hydrocarbons that can be used are those having a boiling point of less than about 260° C. at atmospheric pressure and having from 6 to about 10 carbon atoms per molecule. Halogenated aromatic hydrocarbons having up to 4 halogen atoms, preferably chlorine atoms, can also be used so long as these compounds have a boiling point less than about 260° C. and from 6 to about 10 carbon atoms per molecule. For convenience, a normally liquid aromatic hydrocarbon solvent is generally preferred.

Examples of suitable solvents that can be used include benzene, alkylated benzene such as toluene (presently preferred), o-, m-, and p-xylene and combinations thereof, mesitylene, p-cymene, naphthalene, the three isomeric tetrachlorobenzenes (1,2,3,4; 1,2,3,5; 1,2,4,5), the three isomeric trichlorobenzenes (1,2,3; 1,2,4; 1,3,5), the o-, m-, and p-dibromobenzenes, 2,5-dibromotoluene, the o-, m-, and p-dichlorobenzenes, o-, m-, and p-chlorotoluenes, and the like, and mixtures thereof.

It is also within the scope of the invention to use mixtures of a normally liquid paraffin or cycloparaffin having up to about 10 carbon atoms per molecule with a minor amount of a "suitable" aromatic as defined above.

Suitable metal halides that can be used include the halides of aluminum, gallium, and indium of Periodic Group IIIA. Boron halides (non-metal) are not operative and thallium halides are deemed to be too poisonous for use in this invention. Aluminum halides are preferred, particularly aluminum trichloride.

The invention is applicable for use with any normally solid, heat-curable, high molecular weight arylene sulfide polymer such as those that can be formed into fibers and films. Arylene sulfide polymers which are normally encountered in the process of this invention include arylene sulfide polymers which have a melt flow of at least about 2 and generally within the range of about 10 to about 400 and higher (determined by the method of ASTM D 1238-70, modified to a temperature of 316° C. using a 5-kg weight, the value being expressed as g/10 min.). Thus, the arylene sulfide polymers can be linear, branched, or lightly crosslinked. Although the method by which the polymers of this description are produced is not critical, preferably the polymer employed in the process is prepared by use of polyhaloaromatic compounds, alkali metal sulfides, and organic amides as described and disclosed in U.S. Pat. No. 3,354,129. Polymer of the cited patent is normally cured to reduce its initial high melt flow to an acceptable melt flow for the myriad uses to which it can be employed. Polymer can also be made by process which gives low melt flow high molecular weight material prepared by use of a p-dihalobenzene and alkali metal sulfide and organic amide and an alkali metal carboxylate as in U.S. Pat. No. 3,919,177. The disclosures of U.S. Pat. Nos. 3,354,129 and 3,919,177 are hereby incorporated by reference.

The amount of metal halide employed is directly related to the amount of arylene sulfide polymer present. Generally, on a mole basis, the ratio of metal halide:repeating unit of arylene sulfide polymer can range from about 0.5:1 to about 10:1, preferably about 1:1.

The quantity of solvent employed is also conveniently related on a mole basis to the amount of metal halide. Generally, the solvent:metal halide mole ratio can range from about 5:2 to about 160:1, preferably from about 20:1 to about 110:1.

In terms of a weight basis for the toluene-AlCl$_3$ system, the corresponding mole ratios noted above can be expressed as ranging from about 7:1 to about 145:1, preferably from about 30:1 to about 110:1.

The cleaning process is normally conducted at atmospheric pressure, for convenience, although it can be carried out at less than or greater than said pressure. For example, it can range from about 0.1 to about 10 times atmospheric pressure.

At atmospheric pressure, the process temperature can range from 20 to about 150 C., more preferably from about 50-100 C. Agitation is desirably employed.

The time required to clean the process equipment or parts thereof is, of course, dependent upon the temperature employed and the thickness of the material to be removed. Higher temperatures require less time than cooler temperatures. Generally, the time can range from about 5 minutes to about 5 hours, or longer. For many applications a time ranging from about 30 to 60 minutes appears to be adequate.

Following the cleaning operation, the temperature of the mixture can be reduced to about room temperature, e.g. 25° C., and the excess metal halide in the mixture can be deactivated by contact with a suitable quantity, generally a large excess, of an organic liquid, preferably an alkanol containing from 1 to about 6 carbon atoms, preferably from 1 to 3 carbon atoms per molecule. Examples of suitable alcohols include methanol, ethanol, 1-propanol, 2-propanol, 1-butanol, 2-methyl-2-propanol, 1-pentanol, 1-hexanol, and the like and mixtures. Methanol is presently preferred because of its relatively low cost, availability, and efficacy in the process.

An organic liquid is preferred as the deactivating agent, most preferably one that is miscible with the initial solvent and the reaction products to facilitate separation of the cleaned part from the total reaction mixture. Following deactivation, the mixture can be diluted with water, optionally containing a dilute inorganic acid, such as hydrochloric acid, phosphoric acid, sulfuric acid, and the like, to help solubilize any solid aluminum salts that may be formed in the deactivation step. The solvents and salts can be recovered by conventional methods, e.g. distillation, precipitation, and the like. The separated, cleaned part can be rinsed with water, dried, and restored to service.

As noted above, the instant invention is particularly applicable to cleaning of process equipment to remove polymeric deposits formed during operation, for example, melt extrusion equipment normally employed to melt extrude fibers or other formed articles. The process equipment can be cleaned in situ by merely passing the solubilizing solution of the invention through the process equipment to remove the polymeric deposits followed by rinsing of the equipment, for example, with water, to remove residual solvent, and then returning the process equipment to normal use once again. If desired, a batch operation can be carried out by removing parts of the processing equipment having polymeric deposit thereon and immersing or otherwise contacting the part with the solubilizing solution of the invention. The piece of processing equipment, for example a filter, can be removed from the solution, separately washed to remove residual solution, and returned to the processing equipment. The solubilizing solution can be deactivated by contacting with an alkanol so that the solution can be safely disposed and, if desired, as noted above the solution can be returned for reuse. A procedure for separately recovering the solubilizing solution has been set forth above.

The process of the instant invention can produce a variety of linear aryl sulfides which can contain 1 or 2 methyl groups. The solution containing the solubilized arylene sulfide polymer which comprises a complex mixture of aryl sulfides is contacted sequentially with the deactivating agent and then with dilute acid. The organic phase is then separated from the aqueous phase such as by decanting or the like and can be dried. The solvent can then be partially or substantially removed by distillation or the like to obtain the product which is a mixture of the sulfides. The components of the mixture can be separated by employing conventional techniques such as by fractional distillation, fractional crystallization, solvent extraction, and the like.

Representative aryl sulfides produced from arylene sulfide polymers, particularly PPS, include diphenyl sulfide, m-tolyl phenyl sulfide, 4,4'-ditolyl sulfide, 3-chlorophenyl phenyl sulfide, 4-chlorophenyl 4'-tolyl sulfide, 4-chlorophenyl xylyl sulfide (several possible isomers), thioxanthene, thianthrene, and polyphenyl thioethers as represented by the formula

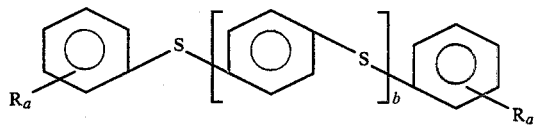

wherein R is a methyl group, a is an integer of 0 or 1 and b is an integer of 1 to about 3.

Specific examples of the polyphenyl thioethers include the following compounds: p-bis(phenylthio)benzene, p-(m-tolylthio)phenylbenzene, p-bis(p-tolylthio)benzene, bis[p-(phenylthio)phenyl]sulfide, p-(m-tolylthio)phenylthiobenzene, p-bis[p-(phenylthio)phenylthio]benzene and the like.

The polyphenyl thioethers can be used singly or in admixture in such applications as hydraulic fluids, lubricants, heat transfer fluids, stabilizers, and the like.

The following examples are intended to illustrate the compositions and process of the invention.

EXAMPLE 1

In a 100 mL glass flask protected with a drying tube and containing a magnetic stirring bar was placed 1.5 g (0.011 mole) of $AlCl_3$ and 21.6 g of toluene to form a suspension. To the stirred suspension at about 23° C. was added 1 g (0.0092 mole repeating units) of PPS in powder form. The mixture darkened and after about 1 hour the solids dissolved yielding a dark opaque, non-viscous solution. After another hour, the mixture was passed through a glass filter (essentially no solids removed) and into a receiving vessel where the liquid separated into two liquid phases. The lower phase was dark in color and the upper phase was lighter in color. The combined phases were poured into about 200 mL of methanol where it was observed that the color was almost immediately discharged and that a homogeneous solution was formed. The mole ratio of $AlCl_3$:PPS repeat unit was about 1.2:1. The toluene:$AlCl_3$ wt. ratio was 14:1.

This example demonstrates that PPS can be readily solubilized at room temperature, 23° C., in a toluene-$AlCl_3$ mixture.

EXAMPLE 2

Using the apparatus of Example 1, additionally equipped with a reflux column and employing the same quantities of toluene and $AlCl_3$, a used stainless steel filter unit about 70 mm (2¾″) in diameter and about 0.5 mm (20 mils) in thickness utilized in an extruder for converting fiber grade PPS into fibers was placed in the flask. The filter unit is commercially available from Fluid Dynamics, DeLand, Fla. (a Brunswick Co.) as Dynalloy ®X8L and is described as comprising metallurgically bonded micronic size stainless steel fibers. The filter unit was used to strain extraneous material from the PPS melt prior to its entry into the fiber die. The used filter unit contained trash, e.g. dirt, crosslinked, very high molecular weight PPS gel particles and unchanged PPS. It was so clogged that it was not servicable for continued duty in the production of fibers.

The stirred mixture containing the filter unit was heated for about 4 hours at 75° C. and then allowed to cool undisturbed overnight. The next day the reaction mixtures was poured into about 200 mL of methanol. The filter unit was removed, rinsed with water and dried. It was visually noted that the filter unit was cleaned of all polymer. Examination of it under a microscope also revealed it to be free of char particles.

Similar used filter packs were also treated with the same toluene-$AlCl_3$ solution at about 70° C. following the previous procedure. It was found that after about a ½ to 1 hour treatment in the mixture that clean packs can be produced. In this procedure, a pack was removed from the mixture, immersed in methanol, rinsed with methanol, then with acetone and dried. Visual inspection of the treated packs indicated all PPS had been removed.

This example shows that objects coated with PPS can be cleaned of the polymer by following the inventive process.

EXAMPLE 3

A sample of extruded, non-oriented PPS film about 7 mils in thickness was heated for 2 hours in air on a hotplate at about 395° C. in order to cause extensive crosslinking. The cooled, recovered film, still about 7 mils in thickness was then cut into pieces about 1 cm square.

A suspension of 1 g of $AlCl_3$ in 86.6 g (100 mL) of toluene was made by charging each component to a glass flask equipped for stirring, at room temperature, e.g. about 23° C. To the stirred mixture was added 6 pieces of the crosslinked film. This material did not appear to dissolve under these conditions so the temperature was raised to 47° C. whereupon after 10 minutes it was noted that none of the film had dissolved. The temperature was then raised to 54° C. resulting in a dark opaque mixture after 5 minutes. The temperature was then raised to 60° C. and after 10 minutes at this temperature all of the film had dissolved. The mixture was cooled to about room temperature and an excess of methanol was added to deactivate any remaining $AlCl_3$. After standing for 3 days at room temperature the solution was golden brown in color and a small amount of a fine light colored precipitate was evident on the container bottom.

In another experiment, 6 pieces of the crosslinked film was placed in about 10 mL of 1-chloronapthalene and boiled for 20 minutes at 260° C. The film did not appear to dissolve. However, when the mixture was cooled to room temperature, a slight cloudiness developed which indicated that a very small amount of the film had been dissolved by the treatment.

This example shows that the inventive process readily solubilizes even crosslinked PPS whereas a prior art solvent (1-chloronaphthalene) is ineffective or almost totally ineffective under the conditions used.

EXAMPLE 4

Following the general procedure employed before several runs were made using about 4.4 g of $AlCl_3$ in combination with 100 mL (78 g) of cyclohexane, in place of toluene as the solvent. About 3.6 g of PPS powder was subsequently charged to each mixture.

After stirring at room temperature, 23° C., for 1 hour it was noted that the reaction mixture had assumed a tan-green appearance. After stirring for 1 hour at 70° C., the reaction mixture was dark green in color. It was then deactivated with excess methanol as before, then treated with water. A gummy tan residue was noted in the flask. (Under the same conditions a reaction mixture consisting of $AlCl_3$-toluene-PPS treated with methanol then water yielded little or no residue.) The residue noted in this run is believed to be primarily unchanged PPS indicating that only a relatively small portion of the initial PPS was solubilized.

The above results indicate that cycloparaffins alone are inoperable in the invention process in contrast to the preferred aromatic hydrocarbons as previously described.

EXAMPLE 5

A series of runs was made utilizing in each run a mixture containing toluene, a compound selected from one of $FeCl_3$, $SnCl_4$ or $TiCl_4$ and PPS powder as generally described before.

Thus, a mixture consisting of about 5 g (0.02 mole) of $SnCl_4$, about 130 g of toluene and 2.2 g (0.02 mole repeating unit) of PPS powder showed no change at room temperature and none when heated to 110° C. The dissolution system had little or no effect on PPS under the conditions used.

A mixture consisting of 12.2 g (0.07 mole) of $FeCl_3$, about 130 g of toluene and 2.2 g (0.02 mole repeating unit) of PPS powder was made. The PPS powder turned dark green in color. The mixture was heated to 70° C. for 2 hours and turned dark purple in color. Very little of the powder dissolved.

A mixture consisting of about 20 g (0.1 mole) of $TiCl_4$, about 180 g of toluene and 3 g of PPS powder was prepared. The mixture turned dark brown in color but there appeared to be little PPS dissolution at room temperature. There also was little or no PPS dissolution at 80° C. or after 2 hours at 110° C.

EXAMPLE 6

In a solution containing 216.5 g of toluene and 12.8 g of $AlCl_3$ was placed an unused stainless steel filter pack identical to the one used in the extrusion of PPS fibers as described in Example 2. The filter pack weighed 3.8 g. The mixture was heated to 70° C. and held at that temperature for one hour. No unusual color change was noted, e.g., the color was reddish-brown typically observed in heating toluene-$AlCl_3$ mixture.

The pack was removed from the mixture, quenched in methanol, washed and dried. The processed filter pack was found to weigh 3.7 g, indicating a weight loss of about 3.8 wt. %.

This example shows that the invention mixtures can slightly attack metal substrates but the effect is believed to be inconsequential for many cleaning operations.

In each of the following examples polyphenylene sulfide was used as 0.5 g of amorphous, 7 mil thick film and 2 g of aluminum trichloride was used. A short summary of each run follows. The same equipment was used as in Example 1 described above.

EXAMPLE 7

A flask was charged with 100 cc of chlorobenzene (110.7 g, 0.983 mole), 2 g of $AlCl_3$ (0.0150 mole) and 0.5 g of PPS film (0.0046 mole repeating until) at 23° C. After heating to 53° C. over a 35 minute period, no film was seen. In 10 more minutes at 70° C., it was seen the mixture was black with suspended white particles. Cooling to 22° C. with addition of 5 cc of methanol resulted in an olive green solution with a light sludge that redissolved in the mixture. Mole ratios: $AlCl_3$:PPS=0.33, solvent: $AlCl_3$=65; weight ratio solvent; $AlCl_3$=55.

EXAMPLE 8

A flask was charged with 100 cc of 1,2,4-trichlorobenzene (144.6 g, 0.797 mole), 2 g $AlCl_3$ (0.0150 mole), 0.5 g PPS (0.0046 mole) at 20° C. Heating to 78° C. over 38 minute period resulted in blue-gray solution containing suspended white particle and a darkened film. After 16 minutes more heating (now 90° C.) a dark green solution resulted with no film visible. The mixture was cooled to 38° C. and methanol added as before. The mixture assumed a gold color, dark green residue on flask walls, the film had disappeared. Mole ratios: $AlCl_3$:PPS=3.3, solvent: $AlCl_3$=53; weight ratio solvent: $AlCl_3$=72.

EXAMPLE 9

In a control run, a flask was charged with 100 cc of cyclohexane (77.9 g, 0.927 mole), 2.5 g biphenyl (0.0162 mole), 2 g $AlCl_3$ (0.0150 mole), 0.5 g PPS (0.0046 mole) at 21° C. After heating to 81° C. over a 70 minute period, the mixture was a murky reddish-brown and the film, still visible, was moss green in color. After cooling and adding methanol as before, the colors disappeared leaving a white precipitate and the film showing its original brownish color but appeared to be annealed by the treatment. Mole ratios: $AlCl_3$:PPS=3.3, solvents: $AlCl_3$=63; weight ratio solvent: $AlCl_3$=40.

EXAMPLE 10

A flask was charged with 100 cc cyclohexane (77.9 g, 0.927 mole), 2 g of naphthalene (0.0156 mole), 2 g $AlCl_3$ (0.0150 mole), 0.5 g PPS (0.0046 mole) at 18° C. After heating to about 59° C. over a 25 minute period the mixture was brown with suspended white particle and the film was darkening. After 45 more minutes (now 81° C.), the mixture was very dark and the flask walls had a black residue. After cooling and adding methanol as before, the mixture was seen to be a light reddish-brown solution, the flask walls were coated with a black residue and the film had disappeared. Mole ratios: $AlCl_3$:PPS=3.3, solvents: $AlCl_3$=63; weight ratio solvent: $AlCl_3$=40.

EXAMPLE 11

Flask charged with 100 cc of 1,2,4-trimethylbenzene (87.6 g, 0.730 mole), 2 g $AlCl_3$ (0.0150 mole), 0.5 g PPS (0.0046 mole) at 19° C. After heating to about 53° C. over a 25 minute period, a transparent red-brown solution was transparent with the brown film visible in it. After 12 more minutes (now 63° C.), the film disappeared, the solution was still the same color and an oily residue was apparent. After cooling and adding methanol as before it was observed that the solution was a cloudy pale red-orange in color and a red residue was on the flask walls. In 5 more minutes the residue dissolved and the solution after discontinuing stirring settled into 2 pale-gold phases. Mole ratios: $AlCl_3$:PPS=3.3, solvent: $AlCl_3$=49; weight ratio solvent: $AlCl_3$=44.

EXAMPLE 12

A flask was charged with 173.2 g (1.88 mole) of toluene, 8.2 g (0.062 mole) of $AlCl_3$ and 8.0 g of 2 melt flow PPS (0.74 mole repeating unit PPS) at 20° C. and the mixture stirred. Within 2 minutes the solution became green and after 1 hour it was black. No indication of heat was noted during the dissolution.

A 50 mL portion of the black solution was set aside undisturbed at about 20° C. for 2 days. It was noted that a lower small, oily, very dark colored phase had separated from the remainder of the solution.

A 10 mL portion of the black solution was diluted with 90 mL of toluene to give a green solution. After 2 days, a small, oily, dark green-brown phase had separated from the remainder of the solution.

A 10 mL portion of the black solution was diluted with 90 mL of methanol to give a solution which immediately turned clear and colorless.

The remainder of the black solution was heated with stirring for 2 hours at 60°–70° C. During this treatment the black solution assumed a purple-black color and apparently consisted of 2 phases, a dense highly colored lower phase and a less dense, less colored toluene phase. Heating and stirring was discontinued and after 2 days at room temperature the lower phase had settled. The combined phases were mixed with about 6 mL of methanol to give a somewhat turbid straw-colored mixture. The resulting mixture was shaken with about 140 mL of a hydrochloric acid solution made by mixing 3 volumes of water and 1 volume of concentrated hydrochloric acid, e.g., containing about 37 weight percent hydrogen chloride. The treated mixture was allowed to stand undisturbed until settling was complete and the upper toluene phase was separated and dried over anhydrous sodium carbonate. The dried toluene phase was subsequently boiled to remove excess toluene to give a golden-brown viscous liquid as the final product.

The viscous liquid was analyzed by means of gas chromatography-mass spectrometry and the compounds listed below were identified. The relative amounts of each compound present in the viscous liquid are described as small, medium or large.

| Compound | Relative Amount |
| --- | --- |
| diphenyl sulfide | large |
| o-, m-, p-tolyl phenyl sulfides | large |
| bis(o-, m-, p-tolyl) sulfides (5 isomers) | medium |
| 4-tolyl 4'-chlorophenyl sulfide | small |
| 4-chlorophenyl xylyl sulfide (several possible isomers) | small |
| thioxanthene | small |
| thianthrene | small |
| p-bis(phenylthio)benzene | large |
| p-(tolylthio)phenylbenzenes (3 isomers) | large |
| p-bis(tolylthio)sulfides (6 isomers) | medium |

The results indicate that various sulfur-containing organic compounds such as those named above can be conveniently produced by the method of the invention. Separation of the various compounds can be effected by following conventional techniques as previously disclosed.

I claim:

1. A process for solubilizing (depolymerizing) arylene sulfide polymers which comprises contacting same with a solution comprising a metal halide selected from the halides of aluminum, gallium, and indium and at least one aromatic solvent having from 6 to about 10 carbon atoms per molecule and a boiling point less than about 260° C. at atmospheric pressure selected from aromatic hydrocarbons and and halogenated derivatives thereof having up to 4 halogen atoms, and optionally in admixture with a normally liquid paraffin or cycloparaffin having up to 10 carbon atoms per molecule, under conditions of temperature and pressure which solubilize said arylene sulfide polymer and form a solution comprising a complex mixture of arylene sulfides.

2. Process according to claim 1 wherein said contacting is effected at a temperature ranging from about 20° to about 150° C. and a pressure from about 0.1 to about 10 atmospheres.

3. Process according to claim 1 wherein said arylene sulfide polymer is poly(p-phenylene sulfide) and said halide is aluminum trichloride.

4. A process according to claim 1 wherein the mole ratio of metal halide to repeating units of polyarylene sulfide ranges from about 0.5:1 to about 10:1 and the mole ratio of aromatic solvent to metal halide ranges from about 5:1 to about 150:1.

5. A process according to claim 1 wherein said arylene sulfide polymer is poly(p-phenylene sulfide), said halide is aluminum trichloride and said aromatic hydrocarbon is toluene.

6. A process according to claim 3 wherein said solvent is selected from toluene, chlorobenzene, 1,2,4-trichlorobenzene, 1,2,4-trimethylbenzene and a mixture of cyclohexane and naphthalene.

7. A process according to claim 6 wherein said contacting is effected at a temperature within the range of about 20° to about 150° C. at a pressure ranging from about 0.1 to about 10 atmospheres.

8. A process according to claim 1 including the additional steps of recovering the aryl sulfides formed during depolymerizing said arylene sulfide polymers which comprises deactivating the metal halides present in the solution containing solubilized arylene sulfide polymer by sequentially contacting same with an alkanol and then with a dilute inorganic acid prior to separating the aryl sulfide components present in the solution.

9. A process according to claim 8 wherein said alkanol contains from 1 to 6 carbon atoms and said acid is hydrochloric acid.

10. A process for cleaning process equipment contaminated with polyarylene sulfide resin deposits which comprises contacting process equipment having said deposits with a solution comprising a metal halide selected from the halides of aluminum, gallium, and indium and at least one aromatic solvent having from 6 to about 10 carbon atoms per molecule and boiling points less than about 260° C. at atmospheric pressure selected from aromatic hydrocarbons and halogenated derivatives thereof having up to 4 halogen atoms, and optionally in admixture with a normally liquid paraffin or cycloparaffin having up to 10 carbon atoms per molecule under conditions of temperature and pressure which solubilize said arylene sulfide polymer, discontinuing contacting of the processing equipment with said solution, and washing the process equipment with water to remove residual solution containing said deposits.

11. A process according to claim 10 wherein said solution after contacting the process equipment is deactivated by contact with an alkanol having from 1 to about 6 carbon atoms per molecule so that the solution can be safely disposed.

12. A process according to claim 11 wherein the deactivated solution is diluted with water and a dilute inorganic acid to solubilize the metal salt and then separately recovering aromatic solvent from the metal salts for reuse.

13. A process according to claim 10 wherein said polyarylene sulfide resin is a poly(p-phenylene sulfide) and said metal halide is aluminum trichloride and said aromatic solvent is toluene.

14. A process according to claim 10 wherein said contacting is effected at a temperature within the range of about 20° to about 150° C. at a pressure from about 0.1 to about 10 atmospheres.

15. A process according to claim 10 including the additional steps of recovering the aryl sulfides formed during depolymerizing said arylene sulfide polymers which comprises deactivating the metal halides present in the solution containing solubilized arylene sulfide polymer by sequentially contacting same with an alkanol and then with a dilute inorganic acid prior to separating the aryl sulfide components present in the solution.

16. A process according to claim 15 wherein said alkanol contains from 1 to 6 carbon atoms and said acid is hydrochloric acid.

* * * * *